United States Patent
Kurashima et al.

(10) Patent No.: US 7,933,308 B2
(45) Date of Patent: Apr. 26, 2011

(54) SIGNAL TRANSMISSION AND RECEPTION DEVICE

(75) Inventors: Shigemi Kurashima, Shinagawa (JP);
Masahiro Yanagi, Shinagawa (JP);
Satoshi Sakurai, Shinagawa (JP);
Takuya Uchiyama, Shinagawa (JP);
Takashi Yuba, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 756 days.

(21) Appl. No.: 11/826,349

(22) Filed: Jul. 13, 2007

(65) Prior Publication Data
US 2008/0212653 A1 Sep. 4, 2008

(30) Foreign Application Priority Data

Mar. 1, 2007 (JP) ................................. 2007-051827

(51) Int. Cl.
*H04B 1/00* (2006.01)

(52) U.S. Cl. ........ 375/130; 375/135; 375/136; 375/145; 375/219; 375/349; 342/27; 342/131; 342/135

(58) Field of Classification Search .................. 375/130, 375/135, 136, 137, 145, 146, 147, 150, 219, 375/259, 286, 295, 302, 316, 350
See application file for complete search history.

(56) References Cited

U.S. PATENT DOCUMENTS

| 5,506,862 | A  | * | 4/1996 | McIntosh ...................... 375/130 |
| 7,148,840 | B2 | * | 12/2006 | Dooi et al. .................... 342/131 |
| 7,202,812 | B2 | * | 4/2007 | Krikorian et al. ............. 342/198 |
| 7,525,477 | B2 | * | 4/2009 | Kurashima et al. ........... 342/135 |
| 7,653,163 | B2 | * | 1/2010 | Sadri et al. .................... 375/349 |
| 7,750,841 | B2 | * | 7/2010 | Oswald et al. ................ 342/147 |
| 2006/0078041 | A1 | * | 4/2006 | Uchiyama et al. ............ 375/146 |
| 2006/0214841 | A1 | * | 9/2006 | Li et al. ......................... 342/118 |
| 2008/0057865 | A1 | * | 3/2008 | Bennett .......................... 455/39 |
| 2008/0182525 | A1 | * | 7/2008 | Rofougaran .................... 455/77 |
| 2008/0285663 | A1 | * | 11/2008 | Fischer ......................... 375/259 |

FOREIGN PATENT DOCUMENTS

JP 04-347943 12/1992
JP 2006-114980 4/2006

* cited by examiner

*Primary Examiner* — Shuwang Liu
*Assistant Examiner* — Hirdepal Singh
(74) *Attorney, Agent, or Firm* — Staas & Halsey LLP

(57) ABSTRACT

A signal transmission and reception device is disclosed that can be made compact and has wide-band band-pass characteristics. The signal transmission and reception device includes a first filtering unit that is composed of a distributed constant circuit and is capable of eliminating a first frequency component or a second frequency component. The second frequency is higher than the first frequency, and a second filtering unit that attenuates components of frequencies lower than the first frequency or components of frequencies higher than the second frequency.

9 Claims, 3 Drawing Sheets

SIGNAL TRANSMISSION AND RECEPTION DEVICE

BACKGROUND OF THE INVENTION

1. Field of the Invention

The present invention generally relates to a signal transmission and reception device which performs communications by using impulse UWB (Ultra Wide Band) signals.

2. Description of the Related Art

In spread spectrum communications, in order to obtain a large variety of correlation characteristics, it is proposed to convert Pseudorandom Noise (PN) codes used in DSSS (Direct Sequence Spread Spectrum) to Return-to-Zero (RZ) codes, and multiply the RZ codes by data. For example, Japanese Laid-Open Patent Application No. 4-347943 (referred to as "reference 1" hereinafter) discloses a technique in this field. Since each PN code can have a positive or a negative value, by converting the PN codes to the RZ codes, output data becomes zero in a certain time period of the PN code, thus, each RZ code can have three types of values, that is, a positive, zero, or a negative value.

On the other hand, a UWB-IR (UWB-Impulse Radio) communication system is attracting attention since the UWB-IR system is capable of large capacity data transmission and is able to accommodate a large number of users. Since impulses shorter than 1 ns are used in the UWB-IR system, and the corresponding frequency band is at a few GHz, conventional radio communications are not interfered with; thus the frequency band can be shared.

For example, it is proposed that a signal transmission device supporting the UWB-IR communications performs spread modulation and RZ conversion of the PN codes on data carried by the carrier, and converts the resulting data to impulse radio signals. Further, a signal reception device for receiving the impulse radio signals has been developed. For example, Japanese Laid-Open Patent Application No. 2006-114980 (referred to as "reference 2" hereinafter) discloses a technique in this field.

In addition to the capability of large capacity data transmission, when the UWB-IR communication system is used in data transmission, it is possible for the transmitter to measure positions with high precision. Further, when a receiver supporting the UWB-IR communications is used together with the transmitter, it is possible to measure distances with high precision.

SUMMARY OF THE INVENTION

It is a general object of the present invention to make some novel improvements.

One specific object of the present invention is to provide a compact signal transmission and reception device having a one-chip impulse receiver and a one-chip impulse transmitter, having low power consumption and capable of position and distance measurements, and data communications.

According to a first aspect of the present invention, there is provided a signal transmission and reception device, comprising:

a transmission unit that converts transmission data spread by spread codes to a RZ signal, multiplies a code of an impulse series by the RZ signal to convert the RZ signal to an impulse radio signal, and transmits the impulse radio signal, said transmission unit being integrated into one chip; and a reception unit that receives and demodulates the impulse radio signal, said reception unit being integrated into one chip.

As an embodiment, a special position of the signal transmission and reception device may be determined when the signal transmission and reception device receives the impulse radio signal transmitted by the signal transmission and reception device itself.

As an embodiment, the signal transmission and reception device further comprises:

a distance measurement unit that measures a distance between the signal transmission and reception device and an object based on a time difference between an impulse radio signal transmitted by the transmission unit toward the object and an impulse radio signal reflected by the object and received by the reception unit.

As an embodiment, the signal transmission and reception device further comprises:

a filtering unit that passes through the impulse radio signal transmitted by the transmission unit and the impulse radio signal received by the reception unit, wherein the filtering unit includes a first pass band for passing through an impulse radio signal for use of Ultra Wide Band communications, a second pass band different from the first pass band and for passing through an impulse radio signal for measuring the distance to the object, and the filtering unit is able to switch the first pass band and the second pass band.

As an embodiment, the signal transmission and reception device further comprises:

an adjustment terminal that connects an adjustment device for adjusting electric power of the impulse radio signal transmitted by the transmission unit.

As an embodiment, the signal transmission and reception device further comprises:

a detection terminal that connects a detection device for detecting a level of the impulse radio signal received by the reception unit.

As an embodiment, in the signal transmission and reception device, a common clock signal is supplied to the transmission unit and the reception unit.

As an embodiment, in the signal transmission and reception device each of the transmission unit and the reception unit is formed of a CMOS or a silicon-germanium semiconductor.

As an embodiment, the signal transmission and reception device further comprises:

a switching unit that connects one of the transmission unit and the reception unit to a transmission and reception antenna; and a controller that controls the switching unit.

As an embodiment, the signal transmission and reception device further comprises:

a sensor terminal that connects an external sensor; and a converter that converts detection signals from the external sensor into digital signals.

According to the present invention, it is possible to provide a compact signal transmission and reception device having a one-chip impulse reception unit and a one-chip impulse transmission unit, having low power consumption and capable of position and distance measurements, and data communications.

These and other objects, features, and advantages of the present invention will become more apparent from the following detailed description of the preferred embodiments given with reference to the accompanying drawings.

DESCRIPTION OF THE PREFERRED EMBODIMENTS

Below, preferred embodiments of the present invention are explained with reference to the accompanying drawings.

Figure 1:
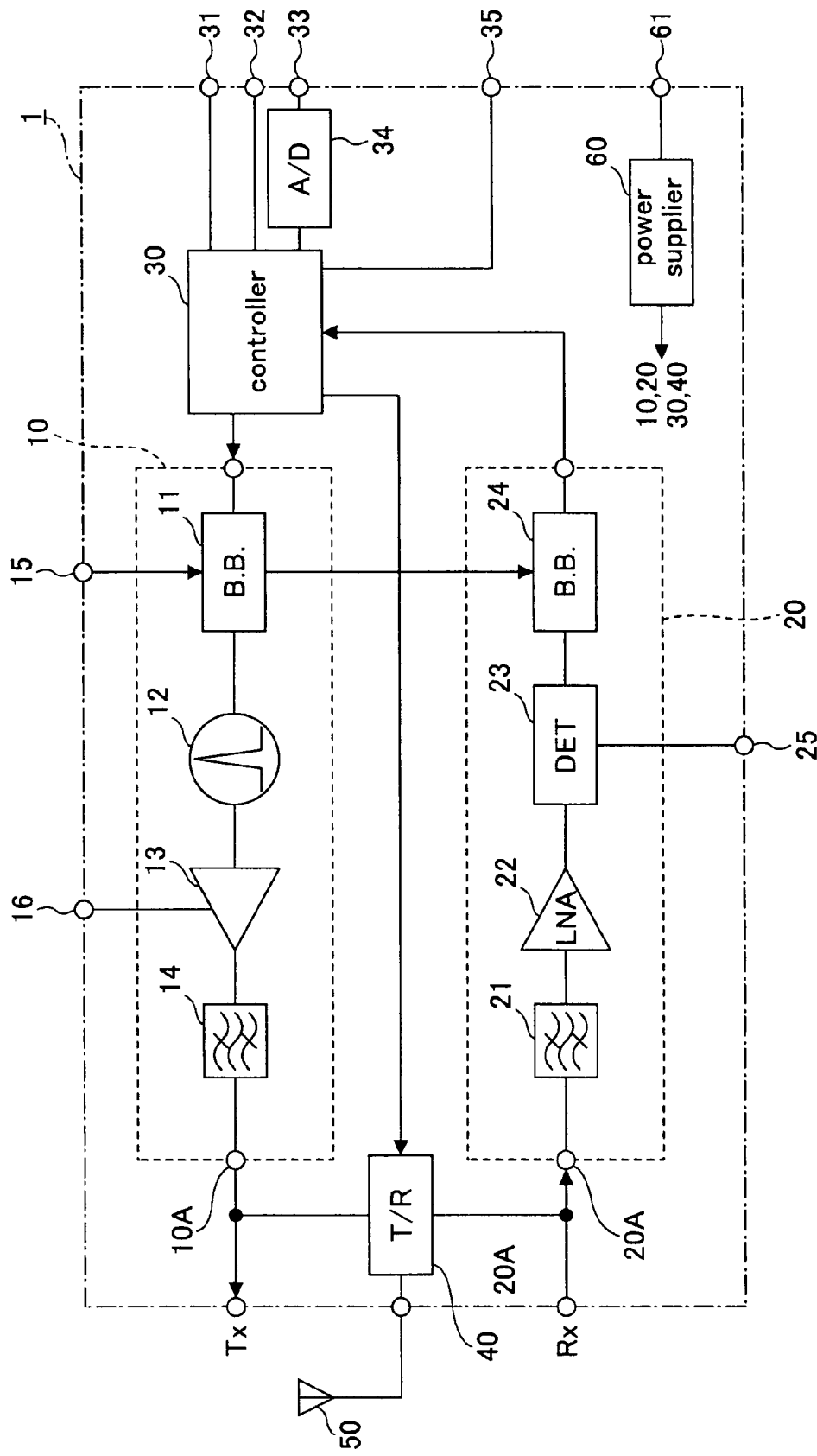
FIG. 1 is a block diagram illustrating a configuration of a signal transmission and reception device according to an embodiment of the present invention.

FIG. 1 is a block diagram illustrating a configuration of a signal transmission and reception device according to an embodiment of the present invention.

As illustrated in FIG. 1, a signal transmission and reception device 1 includes a transmitter 10, a receiver 20, a controller 30, a switch 40, an antenna 50, and a power supplier 60. Each of the transmitter 10, the receiver 20, the controller 30, the switch 40, and the power supplier 60 is integrated into one chip by using CMOS (Complementary Metal Oxide Semiconductor).

The transmitter 10 includes a transmission base band processing unit 11, an impulse converter 12, an amplifier 13, and a transmission filter 14.

The receiver 20 includes a reception filter 21, a low-noise amplifier (LNA) 22, a detector (DET) 23, and a reception base band processing unit 24.

Each of the transmission filter 14 and the reception filter 21 includes a first pass band for passing through impulse radio signals used for Ultra Wide Band communication, and a second pass band for passing through impulse radio signals for distance measurement (as described below), and each of the transmission filter 14 and the reception filter 21 is able to switch the first pass band and the second pass band. For example, the first pass band is set at 4.5 GHz for Ultra Wide Band communications, and the second pass band is set at 1 GHz.

A common clock signal is supplied to the transmission base band processing unit 11 and the reception base band processing unit 24. For example, as shown in FIG. 1, a clock signal input to the transmission base band processing unit 11 via a clock terminal 15 is also input to the reception base band processing unit 24.

The amplifier 13 is connected to an adjustment terminal 16, which connects the amplifier 13 to an adjustment device for adjusting, from the outside, the electric power of the impulse radio signals to be transmitted.

The detector (DET) 23 is connected to a detection terminal 25, which outputs a signal indicating strength of received impulse radio signals. This signal is referred to as a "RSSI (Received Signal Strength Indicator) signal" below, where necessary.

For example, the controller 30 includes a CPU (Central Processing Unit). The controller 30 is connected to an interface (I/F) 31, a pulse input terminal 32, an analog signal input terminal 33 (AIN), an Analog-Digital-Converter (A/D) 34, and a flash memory terminal 35.

For example, the interface (I/F) 31 is a serial peripheral interface (SPI). For example, when a USB (Universal serial Bus) memory is connected to the interface 31, various kinds of data to be transmitted can be input to the signal transmission and reception device 1.

For example, the pulse input terminal 32 is for inputting pulse signals used for distance measurement (as described below).

The analog signal input terminal 33 (AIN) is connected to an acceleration meter (not illustrated). An analog signal input from the acceleration meter through the analog signal input terminal 33 is converted into a digital signal, and is input to the transmitter 10 via the controller 30.

The flash memory terminal 35, for example, similar to the interface (I/F) 31, also supports the serial peripheral interface (SPI). While the interface 31 is used for inputting transmission data, the flash memory terminal 35 is primarily used for inputting identification signals to the controller 30. For example, the identification signals include identifiers for individual identification.

The controller 30 performs calculations for measuring the distance to an object based on a time difference between a transmitted wave and a received wave (namely, the delay time of the received wave relative to the transmitted wave).

The switch 40, which is used for switching transmitted and received signals, is connected to an output terminal 10A of the transmitter 10, and an input terminal 20A of the receiver 20. Additionally, the switch 40 is connected to the antenna 50, which is used for transmitting or receiving signals.

A power terminal 61 is provided on the signal transmission and reception device 1 for supplying power from the outside to the power supplier 60.

Below, operations of the signal transmission and reception device 1 are described.

First, explanations are made when the signal transmission and reception device 1 is used in a position measurement system for measuring the special position of the signal transmission and reception device 1.

For example, the position measurement system includes a calculation device, which performs position measurement processing for measuring the special position of the signal transmission and reception device 1, and plural signal transmission and reception devices connected to the calculation device. Below, the plural signal transmission and reception devices are referred to as "nodes". These nodes are arranged at positions allowing UWB communications with the signal transmission and reception device 1. The signal transmission and reception device 1 is used as a tag, and is arranged in a space which is to be measured. Each of these nodes can be the same as the signal transmission and reception device 1, and this allows radio communications between the nodes.

In the position measurement system, when impulse radio signals transmitted from the signal transmission and reception device 1, which is used as a tag, are received by one of the nodes, the calculation device performs position measurement processing based on the position of the node which receives the impulse radio signals and the time of receiving the impulse radio signals by the node, and by this position measurement processing, the special position of the signal transmission and reception device 1 can be determined with high precision.

Specifically, when the controller 30 directs to turn the transmitter 10 ON, the transmission base band processing unit 11 encodes and compresses digital data used for position measurement by known appropriate methods, and outputs the encoded and compressed data to the impulse converter 12. The impulse converter 12 modulates the compressed data from the transmission base band processing unit 11, for example, by phase modulation or others, and then, the modulated data are further modulated by spread modulation by using the PN (Pseudorandom Noise) codes. Further, the impulse converter 12 converts the data modulated by spread modulation to RZ signals, and the RZ signals are converted into impulse radio signals. At this stage, since the transmitter 10 and the antenna 50 are connected through the switch 40 controlled by the controller 30, the output signals from the impulse converter 12 are amplified by the amplifier 13 to a certain level, and are transmitted from the antenna 50 through the transmission filter 14.

When the impulse radio signals transmitted from the antenna 50 of the signal transmission and reception device 1 are received by one of the nodes of the position measurement system, and the above position measurement processing is executed, the special position of the signal transmission and reception device 1 can be determined with high precision.

When the controller 30 directs to turn the receiver 20 ON, the switch 40 is switched to the receiver 20 side, and the signal transmission and reception device 1 is ready for receiving data from the node.

When the receiver 20 receives the impulse radio signals from the node, the signal transmission and reception device 1 determines whether the received impulse radio signals are those sent to itself.

Figure 2:
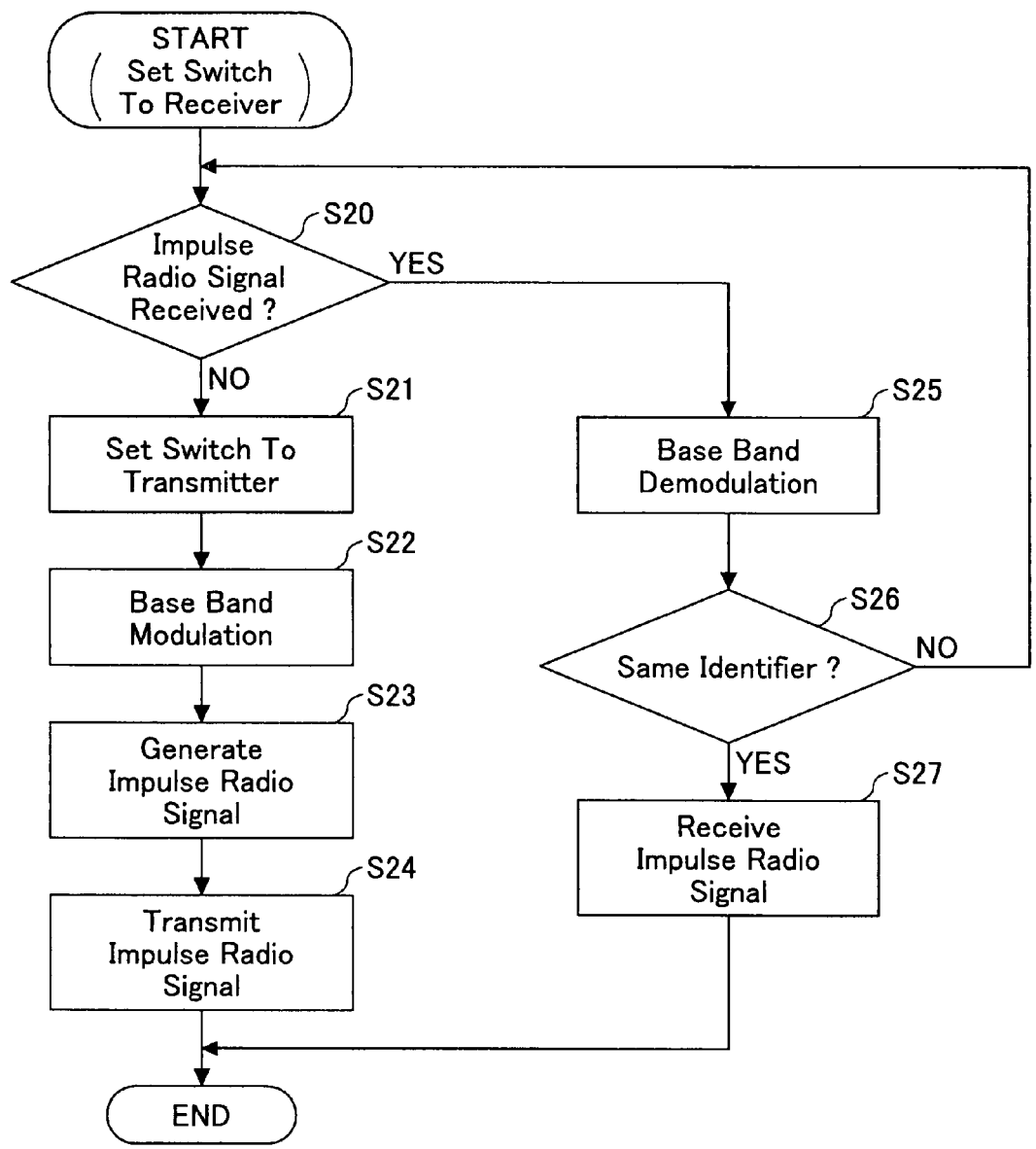
FIG. 2 is a flowchart illustrating switching a signal transmission procedure and a signal reception procedure in the signal transmission and reception device 1 of the present embodiment.

FIG. 2 is a flowchart illustrating switching of a signal transmission procedure and a signal reception procedure in the signal transmission and reception device 1 of the present embodiment.

Note that the procedure shown in FIG. 2 can be executed by the transmitter 10, the receiver 20, and the controller 30.

As shown in FIG. 2, in step S20, the controller 30 switches the switch 40 in each specified time period to determine whether the impulse radio signals are received.

In this way, impulse radio signals involved in the determination by the controller 30 are signals transmitted from a node of the position measurement system. When the receiver 20 receives the impulse radio signals, the receiver 20 demodulates the received impulse radio signals, and transmits the demodulated data to the controller 30.

When it is determined that the impulse radio signals are not received, the procedure proceeds to step S21.

In step S21, the switch 40 is switched to the transmitter 10 side.

In step S22, the transmitter 10 encodes and compresses the transmission data by appropriate coding methods. In this step, the base band is modulated by the transmission base band processing unit 11.

In step S23, the transmitter 10 performs spread modulation and RZ conversion by using the PN (Pseudorandom Noise) codes, and the RZ signals are converted into impulse radio signals. In this way, the impulse radio signals are produced.

In step S24, the impulse radio signals are transmitted from the antenna 50.

In step S25, when it is determined by the controller 30 in step S20 that the impulse radio signals are received, base band demodulation is performed on the received impulse radio signals.

In step S26, the controller 30 confirms the identifier included in the demodulated signals.

In step S27, when the controller 30 determines that the identifier included in the demodulated signals is the same as the identifier of the signal transmission and reception device 1, the controller 30 reads in the received data, and performs processing according to the received data.

Concerning the impulse radio signals transmitted from the position measurement system and received by the receiver 20, for example, when plural signal transmission and reception devices 1 are present in a certain space, the impulse radio signals may be signals including data for ranking the signal transmission and reception devices 1. Due to this, since plural signal transmission and reception devices 1 can be ranked in the position measurement system to perform data communications sequentially, data for performing calling out and standby can be transmitted to the signal transmission and reception devices 1.

Signals indicating data requested by the signal transmission and reception device 1 can be transmitted from the position measurement system to the signal transmission and reception device 1. Due to this, when the signal transmission and reception device 1 is used in the position measurement system, it is possible to construct a network system.

If an acceleration meter is connected to the analog signal input terminal 33 of the signal transmission and reception device 1, and acceleration data detected by the acceleration meter are sent to the position measurement system, the position measurement system is able to determine the position of the signal transmission and reception device 1. Furthermore, the position measurement system can receive acceleration data detected by the acceleration meter connected to the signal transmission and reception device 1.

Figure 3:
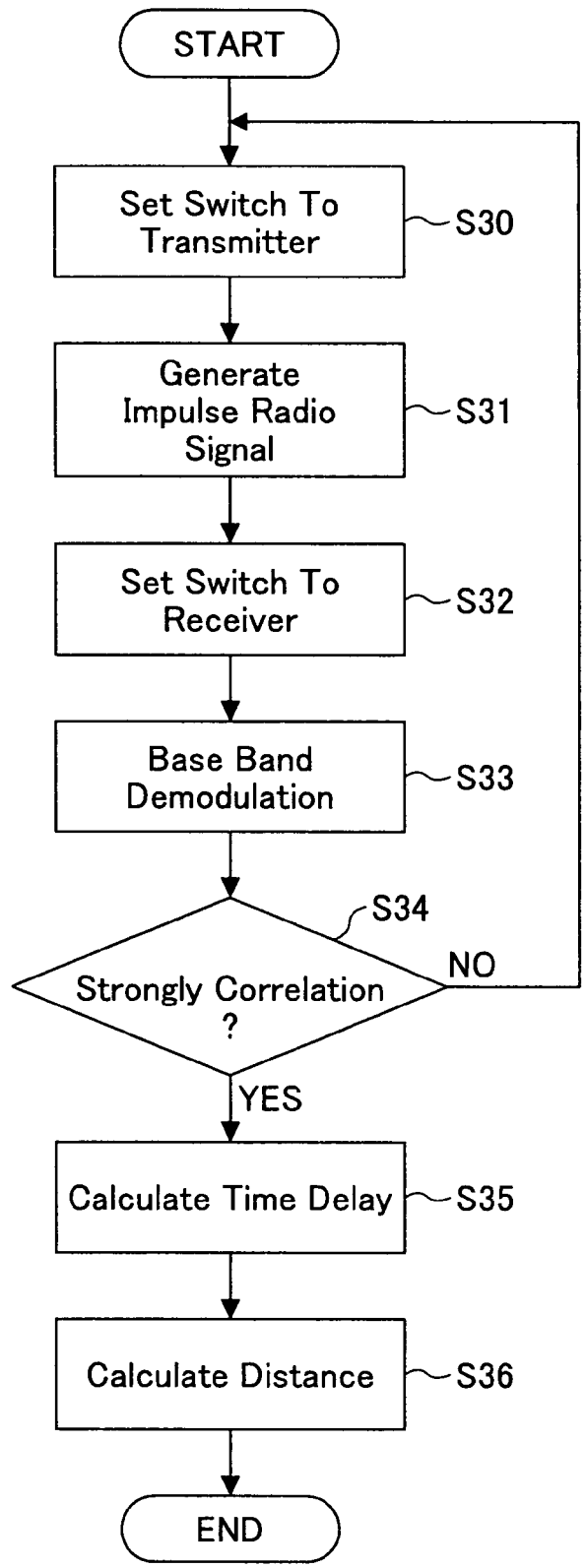
FIG. 3 is a flowchart illustrating a procedure of distance measurement performed by the signal transmission and reception device 1 of the present embodiment.

FIG. 3 is a flowchart illustrating a procedure of distance measurement performed by the signal transmission and reception device 1 of the present embodiment.

As described above, the signal transmission and reception device 1 is able to transmit or receive the impulse radio signals. If the signal transmission and reception device 1 is configured to receive impulse radio signals transmitted by itself toward a specified target, the distance from the signal transmission and reception device 1 to the target can be measured. For example, the controller 30 performs calculations and processing required for the distance measurement.

As shown in FIG. 3, in step S30, the controller 30 switches the switch 40 to the transmitter side.

In step S31, the transmitter 10 generates impulse radio signals based on pulse signals from the controller 30. For example, the pulse signals are input from a pulse generator (not illustrated) connected to the pulse input terminal 32 and are used for distance measurement. At the stage, the pass band of the transmission filter 14 may be switched to the second pass band to transmit impulse radio signals at 1 GHz.

In step S32, the controller 30 switches the switch 40 to the side of the receiver 20.

In step S33, the receiver 20 demodulates the received impulse radio signals.

In step S34, it is determined whether the transmitted impulse radio signals and the received impulse radio signals are sufficiently strongly correlated to each other. For example, this determination can be executed by sliding correlation.

In step S35, when it is determined that sufficiently strong correlation exists, the controller 30 calculates the time delay between the transmitted impulse radio signals and the received impulse radio signals.

In step S36, the controller 30 calculates the distance to the target based on obtained time delay.

When it is determined that sufficiently strong correlation does not exist, the controller 30 returns to step S30.

In this way, the distance to the target can be obtained by the signal transmission and reception device 1 of the present embodiment.

If the signal transmission and reception device 1 is used outside, it can be used in a radar device to realize various applications. That is, the place for using the signal transmission and reception device 1 is not limited to the above mentioned desired space where the position measurement system is installed.

According to the present embodiment, it is possible to provide a compact signal transmission and reception device formed from a one-chip impulse receiver 20 and a one-chip impulse transmitter 10, having low power consumption and capable of position and distance measurements, and data communications.

While the invention is described above with reference to specific embodiments chosen for purpose of illustration, it should be apparent that the invention is not limited to these embodiments, but numerous modifications could be made thereto by those skilled in the art without departing from the basic concept and scope of the invention.

For example, it is described above that each of the transmitter 10, the receiver 20, the controller 30, the switch 40, and the power supplier 60 is integrated into one chip by using CMOS (Complementary Metal Oxide Semiconductor), but the present invention is not limited to this. Instead of CMOS, the transmitter 10, the receiver 20, the controller 30, the switch 40, and the power supplier 60 can be integrated into one chip by using silicon-germanium semiconductor.

It is described above that the transmitter 10 and the receiver 20 have built-in transmission filter 14 and reception filter 21, respectively, but the present invention is not limited to this. The transmission filter 14 and reception filter 21 can be provided outside the signal transmission and reception device 1.

It is described above that the switch 40 switches the connection between the transmitter 10 and the receiver 20 with the antenna 50, but the present invention is not limited to this. For example, the transmitter 10 and the receiver 20 may have their own antennae, respectively. In this case, the switch 40 can be omitted.

It is described above that the first pass band of the transmission filter 14 and reception filter 21 is set at 4.5 GHz, but the present invention is not limited to this. The first pass band can be set to be any value in a range from 3.1 to 10.6 GHz as long as the first pass band is a band allowing Ultra Wide Band communications.

In addition, when the signal transmission and reception device 1 does not measure the distance but only performs Ultra Wide Band communications, the transmission filter 14 and reception filter 21 may be omitted.

It is described above that the switch 40 is installed in the signal transmission and reception device 1, but the present invention is not limited to this. The switch 40 may be provided outside the signal transmission and reception device 1.

It is described above that an acceleration meter is connected to the analog signal input terminal 33, but the present invention is not limited to this. Various sensors can be connected to the analog signal input terminal 33, for example, when a sensor for detecting vital signs like blood pressure and pulsation, the vital data of the owner of the signal transmission and reception device 1 can be transmitted.

This patent application is based on Japanese Priority Patent Application No. 2007-051827 filed on Mar. 1, 2007, the entire contents of which are hereby incorporated by reference.

What is claimed is:

1. A signal transmission and reception device, comprising:
    a transmission unit that converts transmission data spread by spread codes to a Return-to-Zero signal, multiplies a code of an impulse series by the Return-to-Zero signal to convert the Return-to-Zero signal to an impulse radio signal, and transmits the impulse radio signal as a first impulse radio signal via a one-chip transmitter;
    a reception unit that receives and demodulates a second impulse radio signal via a receiver integrated on the one-chip;
    a distance measurement unit connected with the transmission unit and the reception unit that measures a distance from the signal transmission and reception device to an object based on a time difference between the first impulse radio signal transmitted by the transmission unit to the object and the second impulse radio signal reflected from the object and received by the reception unit;
    a first filtering unit disposed in the transmission unit that passes through the first impulse radio signal transmitted by the transmission unit; and
    a second filtering unit disposed in the reception unit that passes through the second impulse radio signal received by the reception unit, and
    wherein a pass band of each of the first filtering unit and the second filtering unit is selectable to one of a first pass band in which passing of an Ultra Wide Band impulse radio signal used for data communication is allowed, and a second pass band, different from the first pass band, in which passing of an Ultra Wide Band impulse radio signal used for distance measurement is allowed.

2. The signal transmission and reception device as claimed in claim 1, wherein
    a special position of the signal transmission and reception device is determined when the signal transmission and reception device receives the impulse radio signal transmitted by the signal transmission and reception device itself.

3. The signal transmission and reception device as claimed in claim 1, further comprising:
    an adjustment terminal that connects an adjustment device for adjusting electric power of the impulse radio signal transmitted by the transmission unit.

4. The signal transmission and reception device as claimed in claim 1, further comprising:
    a detection terminal that connects a detection device for detecting a level of the impulse radio signal received by the reception unit.

5. The signal transmission and reception device as claimed in claim 1, comprising:
    a clock terminal from which a common clock signal is supplied to the transmission unit and the reception unit.

6. The signal transmission and reception device as claimed in claim 1, wherein each of the transmission unit and the reception unit is formed from a CMOS or a silicon-germanium semiconductor.

7. The signal transmission and reception device as claimed in claim 1, further comprising:
    a switching unit that connects one of the transmission unit and the reception unit to a transmission and reception antenna; and
    a controller that controls the switching unit.

8. The signal transmission and reception device as claimed in claim 1, further comprising:
    a sensor terminal that connects an external sensor; and
    a converter that converts detection signals from the external sensor into digital signals.

9. A signal transmission and reception method, comprising:
    converting transmission data spread by spread codes to a Return-to-Zero signal,
    multiplying a code of an impulse series by the Return-to-Zero signal to convert the Return-to-Zero signal to an impulse radio signal, and transmits the impulse radio signal as a first impulse radio signal;

receiving and demodulating a second impulse radio signal, wherein transmission of the first impulse radio signal and reception of the second impulse radio signal is selectively implemented via an integrated chip;

measuring a distance from transmission of the the first impulse radio signal to an object based on a time difference between the first impulse radio signal transmitted to the object and the second impulse radio signal reflected from the object and received; and providing a first filtering of the first impulse radio signal by a first filtering unit at the transmission and a second filtering of the second impulse radio signal by a second filtering unit at the reception, and wherein a pass band of each of the first and second filtering unit is selectable to one of a first pass band in which passing of an Ultra Wide Band impulse radio signal used for data communication is allowed, and a second pass band, different from the first pass band, in which passing of an Ultra Wide Band impulse radio signal used for distance measurement is allowed.

* * * * *